US005675343A

United States Patent [19]

Champeau

[11] Patent Number: 5,675,343

[45] Date of Patent: Oct. 7, 1997

[54] RADIATING-ELEMENT ARRAY ANTENNA

[75] Inventor: André Champeau, Orsay, France

[73] Assignee: Thomson-CSF, Paris, France

[21] Appl. No.: 585,409

[22] Filed: Jan. 11, 1996

Related U.S. Application Data

[63] Continuation of Ser. No. 332,753, Nov. 1, 1994, abandoned.

[30] Foreign Application Priority Data

Nov. 2, 1993 [FR] France .................................. 93 12995

[51] Int. Cl.$^6$ ................................ G01S 3/16; G01S 3/28

[52] U.S. Cl. ........................... 342/378; 342/372; 342/373

[58] Field of Search .................................... 342/371, 372, 342/373, 382, 368, 378

[56] References Cited

U.S. PATENT DOCUMENTS

| | | | |
|---|---|---|---|
| 4,071,848 | 1/1978 | Leeper | 343/844 |
| 5,084,708 | 1/1992 | Champeau | 342/377 |
| 5,243,352 | 9/1993 | Sezai | 342/382 |
| 5,296,863 | 3/1994 | Sezai | 342/371 |
| 5,345,246 | 9/1994 | Sezai | 342/368 |

FOREIGN PATENT DOCUMENTS

| | | |
|---|---|---|
| 0 532 201 | 3/1993 | European Pat. Off. . |

OTHER PUBLICATIONS

A. Ksienski, "Signal Processing Antennas", *Microwave Journal*, vol. 4, No. 10, Oct. 1961, pp. 77–85.

A Farina and R. Giusto, "Wide Deterministic Nulling By Means of Multiplicative Array Techniques", *11th European Microwave Conference—Proceedings*, Sep. 7–11, 1981, pp. 805–812.

D.E.N. Davies, et al., "Low Sidelobe Patterns from Thinned Arrays Using Multiplicative Processing", *IEEE Proceedings F. Communications, Radar & Signal Processing*, vol. 127, No. 1, Feb. 1980, pp. 9–15.

*Primary Examiner*—Theodore M. Blum

*Attorney, Agent, or Firm*—Pollock, Vande Sande & Priddy

[57] ABSTRACT

This radiating-element array antenna has its radiating elements grouped together, in reception, in two sets of parallel linear sub-arrays imbricated and oriented in the two directions, namely the horizontal and vertical directions. It comprises two beam-shaping circuits each receiving the signals from one of the sets of linear sub-arrays and carrying out two reduced beam-shaping operations, one in the elevation plane and other in the relative bearing plane, and one output circuit delivering a reception signal from a non-linear combination, a product or convolution, of the two reduced beam-shaping signals generated by the beam-shaping circuits. This reception signal simulates the signal of an antenna with total beam-shaping in the two planes, namely the elevation and relative bearing planes.

12 Claims, 4 Drawing Sheets

FIG.5
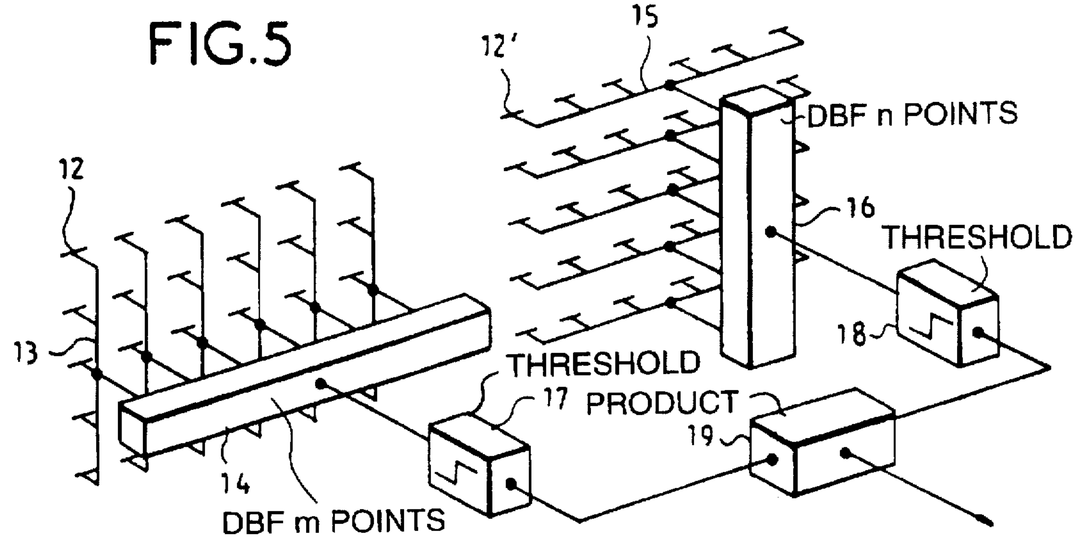
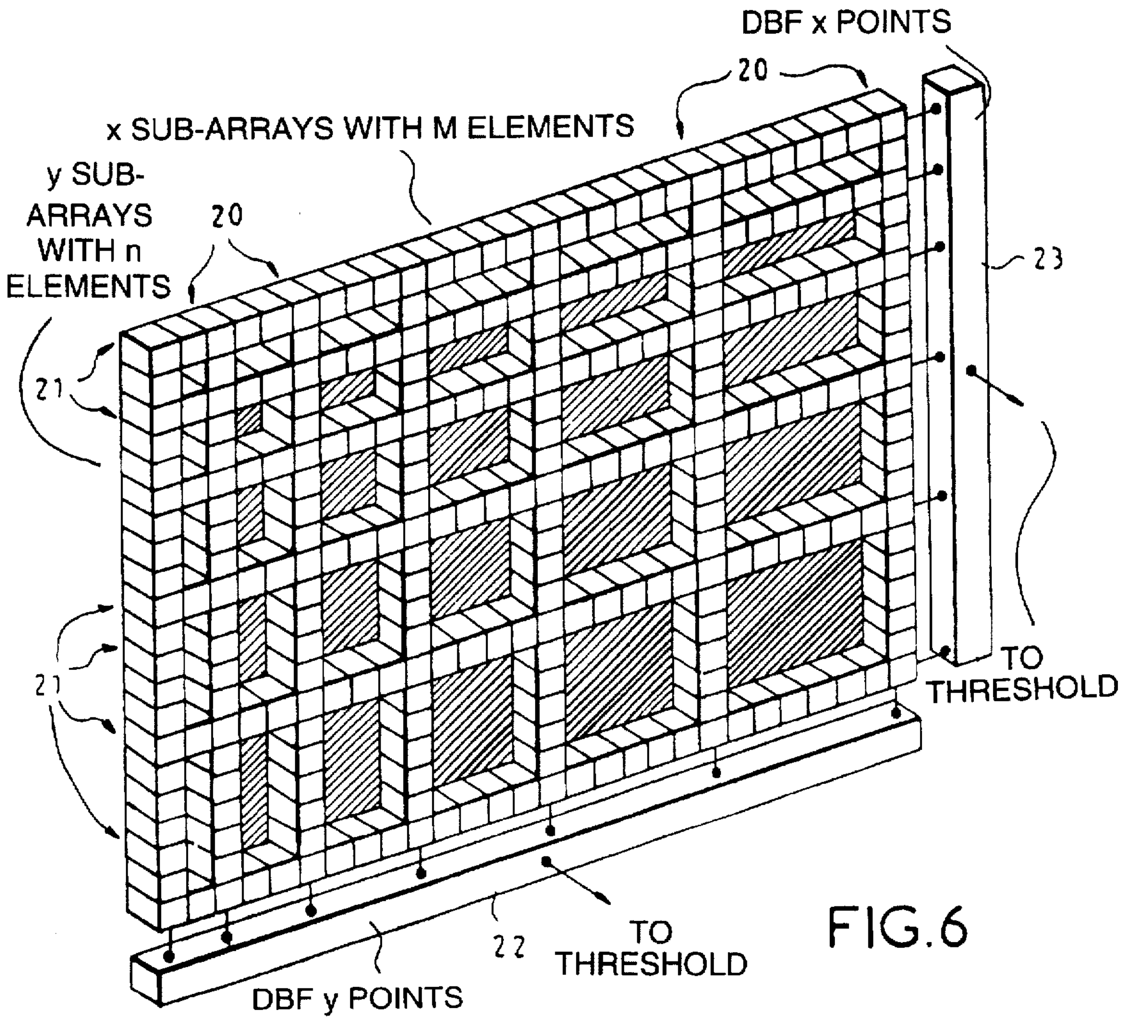
FIG.6

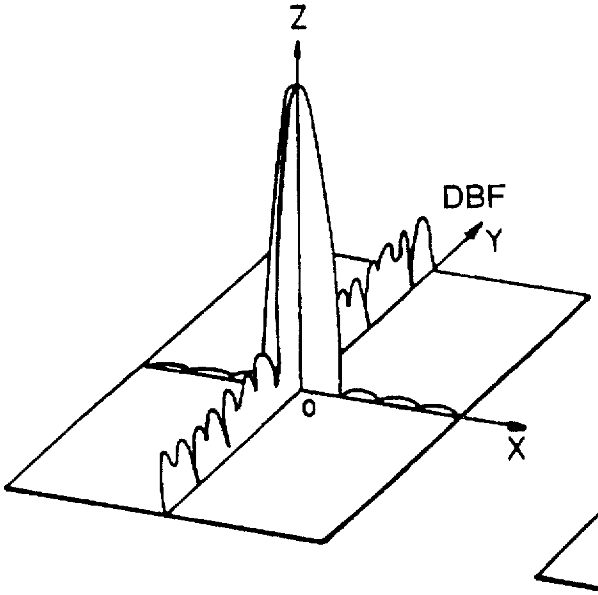
FIG.7b
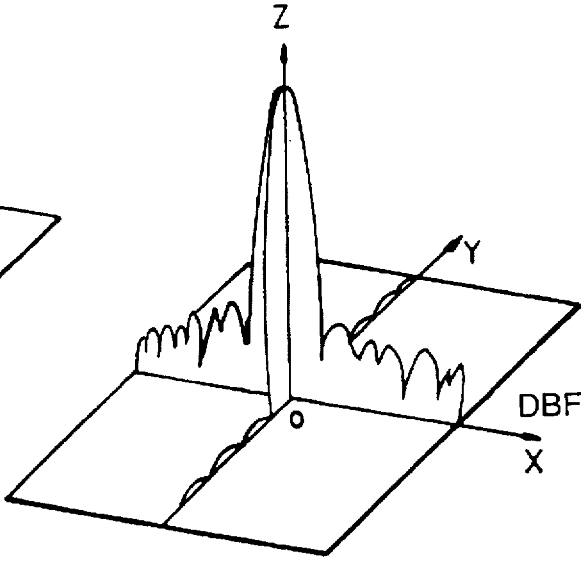
FIG.7a
FIG.8
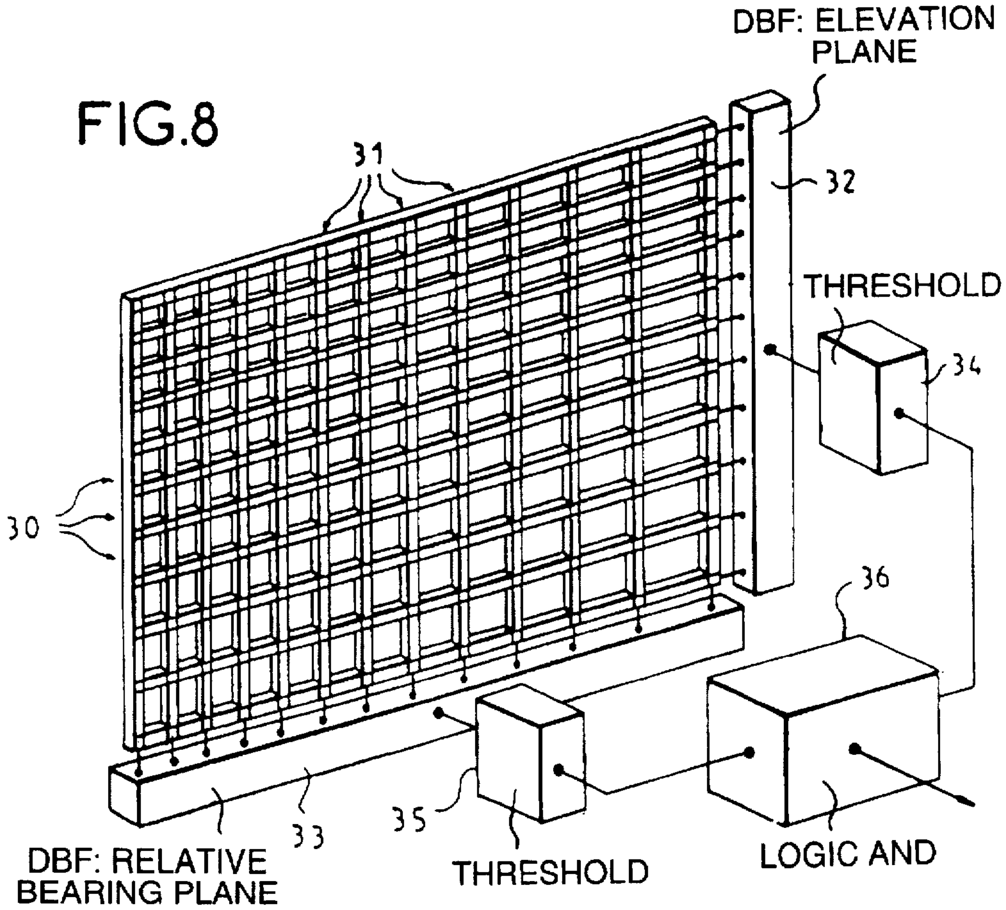

RADIATING-ELEMENT ARRAY ANTENNA

This application is a continuation of U.S. patent application Ser. No. 08/332,753, filed Nov. 1, 1994, now abandoned.

BACKGROUND OF THE INVENTION

The present invention relates to beam-shaping at reception in an array antenna.

An array antenna is formed by an assembly of radiating elements, distributed in an array, which is most usually a surface array, with a mesh size of about half (λ/2) the wavelength of the radiation sent out or received to prevent the appearance of lobes of the array disturbing the directivity of the antenna.

The sizing of the antenna is a function of the amplitude of the signal to be received, namely of the signal-to-noise ratio desired at reception and of the desired angular resolution.

In most cases, the signals to be received are characterized by a uniform surface density of power at the place of reception so that the power of the useful signal received increases as the useful surface of the antenna.

The angular resolution for its part defined in each direction by the linear dimension L of the antenna, in the direction considered, as a ratio to the wavelength λ in the relationship λ/L, the solid angle resolution being defined in the ratio $\lambda^2/S$ where S is the surface area of the antenna.

In practice, a fine angular resolution and a high signal-to-noise ratio are both desirable. If no compromise is accepted, this leads to an excessive number of radiating elements. Since, for reasons of cost, it is desired to restrict the number of radiating elements of an array antenna to utmost extent, it is worthwhile curbing this excess by leaving gaps in the meshwork of radiating elements of the surface of an array antenna. The array antenna is then called thinned or sparse depending on whether the number of missing radiating elements is smaller than or greater than the number of radiating elements present.

In a thinned or sparse array antenna, the absence of certain radiating elements means that the mesh size of about λ/2 no longer prevails. This leads to the appearance of array lobes if the arrangement of missing radiating elements is periodic or to the apace of scattered lobes if this arrangement is random. It is important to reduce these array lobes and scattered lobes to the utmost possible extent.

An array antenna may have mechanical aiming or electronic aiming. When the aiming is electronic, it may be associated with an analog beam-shaping system or with a system of beam-shaping by computation.

The analog beam-shaping system recreates the radiating elements to be fitted out with individual phase-shifter modules enabling the plane of the transmitted or received waves to be oriented in the desired direction. It has the advantage of working equally well in transmission and in reception. If necessary, attenuators or a distribution network enable a weighting in amplitude.

Beam-shaping by computation consists in digitizing the signals received by each of the radiating elements after they have been demodulated coherently and then in phase-shifting them individually and in obtaining a weighted sum thereof by computer to orient the plane of the received wave in the desired direction. It has the advantage of giving great flexibility to beam-shaping since it is possible, by computation, to carry out the simultaneous shaping of several beams aimed in different directions. It furthermore makes it possible to carry out anti-jamming by adjusting the position of the zeros in the radiation pattern. However, its disadvantages are that it cannot be used in transmission, requires costly equipment for the digitization of the signals from the radiating elements and calls for a very large quantity of computations.

To limit the cost of beam-shaping by computation, consideration has been given to dividing the antenna array into sub-arrays and carrying out the beam-shaping in reduced form, not on the individual signals from the radiating elements but on the signal delivered individually by the sub-arrays. The antenna mesh size of about λ/2 is longer maintained. This leads to the appearance of array lobes and/or scattered lobes so that the reduced beam-shaping gives the antenna poor performance values when working on a wide-angled field. However, it is still useful for angular anti-jamming operations directed to a specific point because, in order to be efficient, anti-jamming does not require that the beam-shaping should cover a large number of signals from radiating elements.

In view of these considerations and of the fact that an array antenna is often used both in transmission and in reception, it is the usual practice to fit out the radiating elements of an array antenna with individual phase-shifter modules that enable aiming by analog beam-shaping and to group together the radiating elements of the antenna in sub-arrays to carry out an anti-jamming operation at reception by reduced beam-shaping by computation, the radiating elements being grouped together into surface sub-arrays and the beam-shaping by computation being done in both directions of aim, namely relative bearing and elevation.

Reduced beam-shaping by computation gives rise to a radiation pattern whose major lobe keeps the aiming direction produced by the phase-shifter modules but whose zeros are shifted towards the jammers, this being done by taking minor action on the relative phase shifts imposed on the reception signals of the sub-arrays. Since the total energy is preserved, this radiation pattern retains the drawback of having array lobes at discrete angular positions or scattered lobes depending on whether the organization of the surface sub-arrays in the array is periodic or random, for the sub-arrays necessarily have phase centers spaced out at a distance greater than or equal to λ expressing a sub-sampling of the surface of the array.

An aim of the invention is a system of beam-shaping for an array antenna with a low level of minor lobes or scattered lobes whether this array antenna is filled, thinned or sparse and whether or not it is provided with a system of reduced beam-shaping by computation.

SUMMARY OF THE INVENTION

An object of the invention is a radiating-element array antenna whose radiating elements are grouped together, in reception, in two sets of parallel linear sub-arrays oriented in two different directions, said antenna comprising two beam-shaping circuits each receiving the signals from one of the sets of linear sub-arrays and each delivering a reduced beam-shaping signal, and an output circuit delivering a reception signal from a non-linear combination of the two signals generated by the two beam-shaping circuits.

Advantageously, the directions of the two sets of linear sub-arrays are orthogonal and one of then is oriented along the elevation plane and the other along the bearing plane of the Advantageously, the output circuit achieves a non-linear combination of the two signals generated by the two beam-shaping circuits either by obtaining their product or carrying out their convolution.

BRIEF DESCRIPTION OF THE DRAWINGS

Other features and characteristics of the invention shall appear from the following description of an embodiment given by way of an example. This description will be made with reference to the drawings, of which:

FIG. 5 shows the architecture of the array antenna according to the invention, to which threshold functions have been added;

FIG. 6 illustrates a possible distribution of the radiating elements in a sparse array antenna according to the invention, this said distribution being done according to two sets of linear sub-arrays each feeding a beam-shaping circuit, FIGS. 7*a* and 7*b* show radiation patterns obtained with the beam-shaping circuits of the antenna of FIG. 6, and FIG. 8 shows an architecture of a sparse array antenna according to the invention.

MORE DETAILED DESCRIPTION

Figure 1:
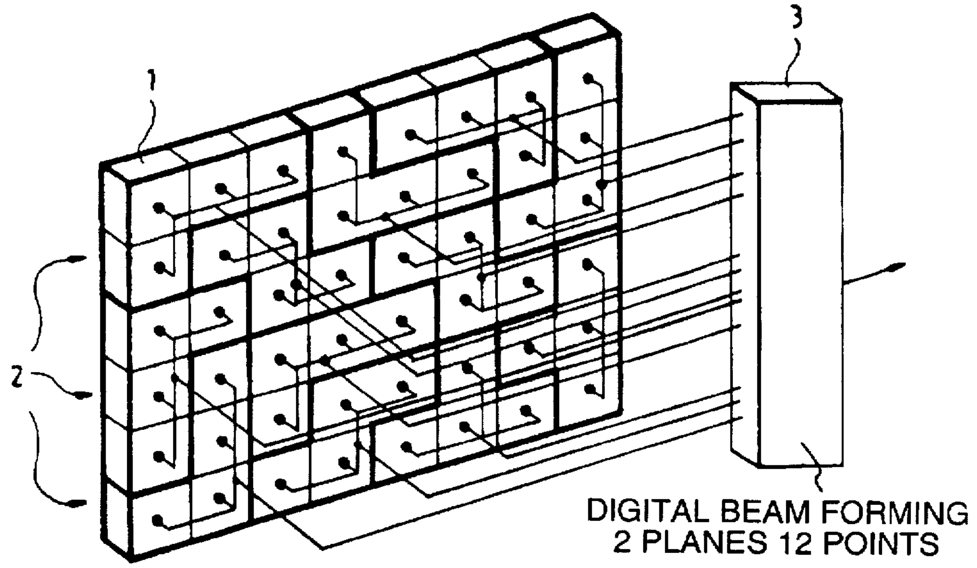
FIG. 1 shows a simplified array antenna with reduced beam-shaping according to the prior art.

FIG. 1 shows a simplified prior art array antenna with a plane stray of 48 radiant elements distributed according to a mesh size of about $\lambda/2$, these radiating elements being fitted out individually with phase-shifter modules and being represented in the form of contiguous blocks 1. Each phase-shifter module enables the individual adjustment of the phase of each radiating element to obtain, at transmission or at reception, a wave plane oriented both in relative hearing and in elevation. At reception, the 48 radiating elements and their phase-shifter modules 1 are grouped together in parallel, by groups of four, into twelve surface sub-arrays 2 whose contours are shown in bold lines. The reception signals from the twelve surface sub-arrays 2 are then directed towards a circuit 3 for beam-shaping by computation which carries out a reduced beam-shaping operation for the anti-jamming, i.e. to obtain a radiation pattern at reception with a major lobe in the aiming direction dictated by the phase-shifter modules and zeros in the directions of the jammers. This reduced beam-shaping operation, which covers twelve reception source signals, makes it possible to place zeros of the radiation pattern in twelve different directions and hence to eliminate eleven jamming directions. However, its performance characteristics are severely limited by the existence of high-level array lobes or scattered lobes due to the spacing equal to or greater than $\lambda$ between the phase centers of the surface sub-arrays.

It is proposed to reduce the drawbacks of the array lobes or scattered lobes due to the grouping of the radiant elements in sub-arrays as is done at present or due to the thinness or sparseness of an array antenna.

To do this, the radiant elements of an array antenna and their individual phase-shifter modules if any are distributed, at reception, into two sets of parallel linear sub-arrays oriented along two distinct directions. A reduced beam-shaping operation is carried out on each of the two sets of parallel linear sub-arrays and the two signals obtained are combined non-linearly by multiplication or convolution after a threshold-setting operation if necessary.

Figure 2:
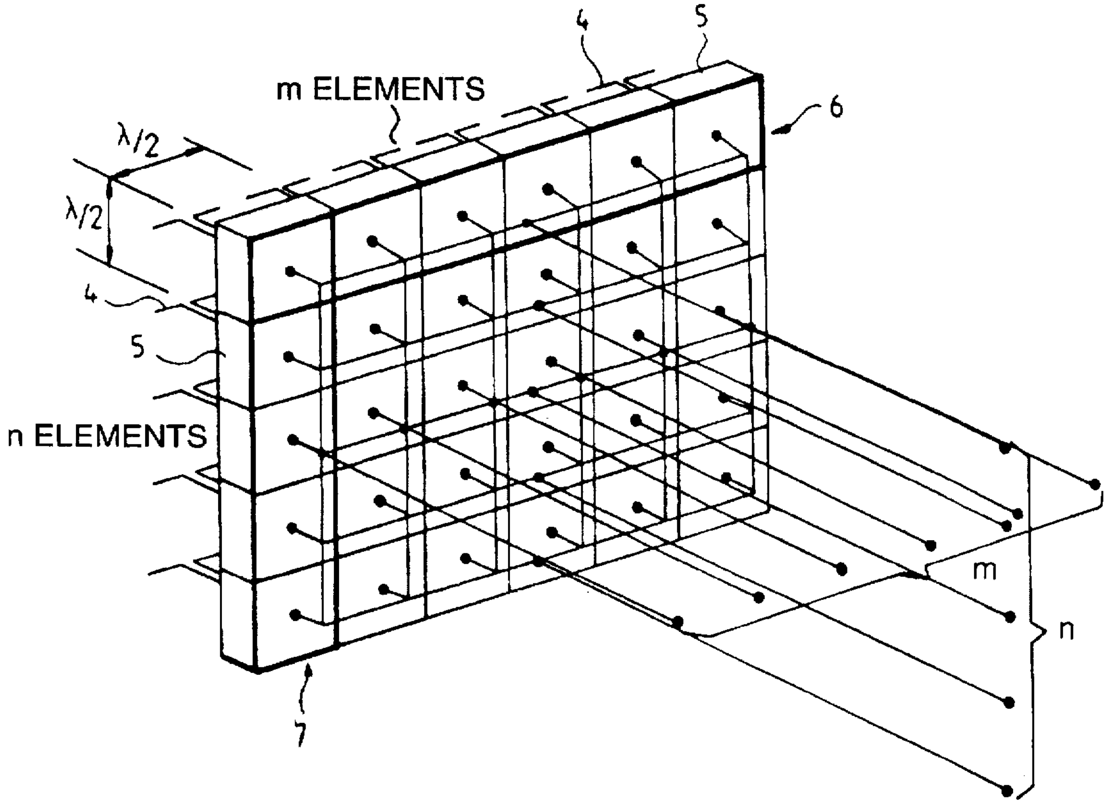
FIG. 2 shows an array antenna according to the invention with its radiating elements organized, in reception mode, in two subsets of linear sub-arrays.

FIG. 2 shows a simplified directional array antenna that can be oriented electronically in elevation and in bearing, implementing this approach. This array antenna is formed by m×n radiating elements 4 associated with individual phase-shifter modules 5 and arranged in rows and columns along a plane array with a mesh size of about $\lambda/2$ to meet the surface sampling criterion that ensures the absence of array lobes in the event of wide-angled electronic scanning.

This antenna is organized, at reception, into two sets of imbricated orthogonal linear sub-arrays:

- a first set formed by a superimposition of n horizontal linear sub-arrays 6, each formed by m radiant elements and their phase-shifter modules 5;
- a second set formed by a horizontal juxtaposition of m vertical linear sub-arrays 7 each constituted by n radiating elements 4 and their phase-shifter modules 5.

Each radiating element with its phase-shifter module participates with the two sets of linear sub-arrays by division of its output signal into two components that are identical in amplitude and in phase although only one output component is shown.

Figure 3:
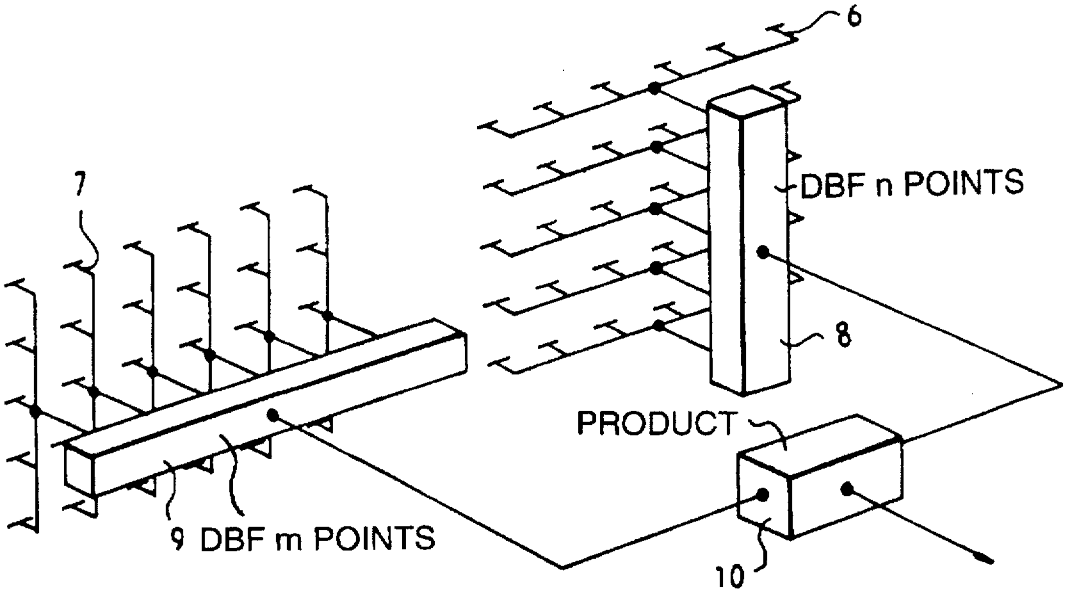
FIG. 3 shows this very same array antenna wherein the two sub-arrays have been separated for the clarity of the explanation.

Hereinafter, reference shall be made to FIG. 3 which represents the two imbricated sets of linear sub-arrays 6, 7 separately in order to facilitate the explanation. The antenna is aimed electronically at reception and at transmission in the case of a radar by means of the phase-shifter modules. At reception, the set of n horizontal linear sub-arrays 6 gives n signals to a first beam-shaping circuit 8 that carries out an n order reduced beam-shaping operation in elevation while the set of m vertical linear sub-arrays 7 gives m signals to a second beam-shaping circuit 9 that carries out an m order reduced beam-shaping operation in relative bearing.

These two reduced beam-shaping operations do not form part of the aiming of the main lobe of the antenna but of the anti-jamming in the other directions. The major lobes of their radiation patterns are aimed in the same direction dictated by the phase-shifter modules.

Reduced beam-shaping in elevation gives a radiation pattern without array lobes or scattered lobes in the relative bearing direction since it is carried out on the signals of the filled horizontal linear sub-arrays and with array lobes or scattered lobes towards the elevation compensated for by the possibility of an adjustment of n−1 zeros in elevation.

Reduced beam-shaping in relative bearing gives a radiation pattern without array lobes or scattered lobes in the elevation direction since it is carried out on the filled horizontal linear sub-array signals and with array lobes or scattered lobes in the relative bearing direction compensated for by the possibility of an adjustment of n−1 zeros in relative bearing.

The two beam-shaping circuits 8 and 9 may carry out reduced beam-shaping operations by computation and may be set up by means of a computer. The n+m output signals of the n+m horizontal and linear sub-arrays 6 and 7 are then demodulated coherently and digitized before being applied thereto. The computer may carry out alternate reduced beam-shaping operations in elevation and bearing, the order in which the beam-shaping is done, whether in elevation and then in bearing or the reverse, being of no consequence.

The signals delivered by the two beam-shaping circuits 8 and 9 are then applied to a combination circuit 10 which takes the product or convolution thereof and delivers a single antenna output signal.

The single antenna output signal appears, when its origin is a single transmitter source picked up by the antenna, as the reception signal of an antenna which has, as a radiation pattern, the product of the two radiation patterns of the reduced beam-shaping in elevation and in bearing: this radiation pattern is devoid of array lobes and scattered lobes due to the sub-sampling because one of the component patterns has no array lobes or scattered lobes in the elevation plane and the other component pattern has no array lobes or scattered lobes in the bearing plane.

We then obtain the properties of a non-reduced beam-shaping antenna relating to n×m points by using only two reduced beam-shaping operations with n+m points.

Figure 4A:
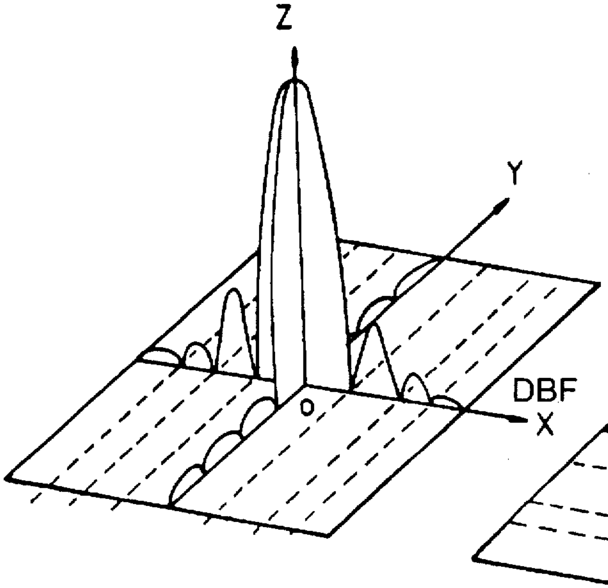
FIGS. 4*a* and 4*b* shows radiation patterns obtained with beam-shaping circuits used in the array antenna of FIG. 3.
Figure 4B:
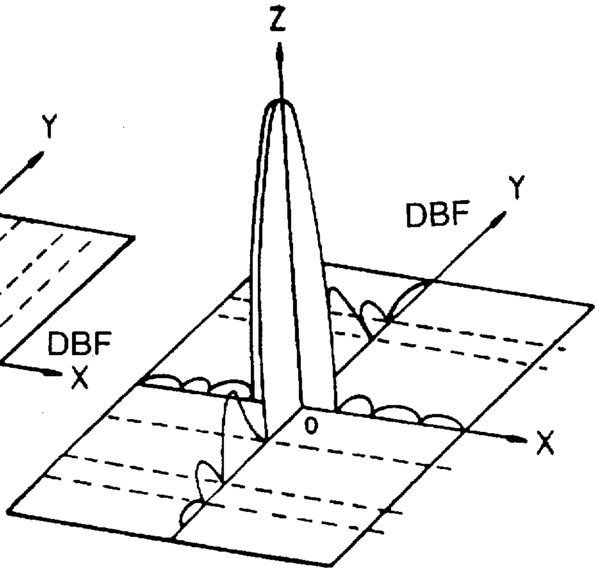

FIGS. 4a and 4b give a view, traced in a reference trihedron with its axis OX graduated in the bearing angle, its axis OY in the elevation angle and its axis OZ at the signal level, of the sections in the XOZ and YOZ planes of the surfaces of the radiation patterns obtained at the output of the two reduced beam-shaping circuits 9 and 8.

FIG. 4a shows the radiation pattern obtained at the output of the beam-shaping circuit 9 working on the signals of the m vertical linear sub-arrays 7. It has a fine major lobe oriented towards the aiming direction dictated by the adjustments of the individual phase-shifter modules surrounded by the minor lobes having low amplitudes in the elevation plane YOZ, for the sub-arrays at the basis of the reduced beam-shaping operations are filled vertical linear sub-arrays, and having amplitudes that are more pronounced in the elevation plane XOZ but with interposed zeros whose positions are adjustable by the adaptive action of the reduced beam-shaping operation.

The adaptive actions of the two reduced beam-shaping operations are done independently, one in the elevation plane and the other in the bearing plane by the creation of zeros in the form of valleys as recorded in FIGS. 4a, 4b by dashes, each valley using only one degree of freedom on only one of the two reduced beam-shaping operations. The product of the two patterns shows two series of zeros that are angularly adjustable, one on the elevation plane and the other on the bearing plane. This shows the usefulness of carrying out, between the signals of the two reduced beam-shaping circuits, a non-linear combination such as a product or a convolution. Furthermore, it is useful to subject the signals of the two reduced beam-shaping circuits to a threshold-setting operation so as to prevent a parasitic signal, picked up by means of one of the two reduced beam-shaping operations, from being validated by the thermal noise coming from the other reduced beam-shaping operation. There is then no incompatibility whatsoever so that the threshold chosen is not that of the limitation of the false alarms by noise in a detection process.

FIG. 5 illustrates the array antenna diagram that results therefrom. This diagram comprises an array of radiating elements positioned in rows and columns in a mesh size of about λ/2, and fitted out with individual phase-shifter modules. For greater clarity, the radiating elements are shown without their phase-shifter modules and the array is shown duplicated at 12 and 12'. At 12, there appears the first grouping, at reception, of the radiating elements in m vertical linear sub-arrays 13 delivering m signals to a first reduced beam-shaping circuit 14 working in the bearing plane. At 12', there appears the second grouping, at reception, of the radiating elements in n horizontal linear sub-arrays 15 delivering n signals to a second reduced beam-shaping circuit 16 working in the bearing plane. Two threshold circuits 17, 18 placed at output of the two beam-shaping circuits 14, 16 remove the bases of their signals before these signals are applied to a non-linear combination circuit 19 which generates the product or the convolution thereof.

The operation produced may be a simple multiplication, an addition of signals for which the logarithm has been taken or an AND type logic operation controlled by signals that have first of all been made bivalent.

The multiplication improves the angular resolution because, for an identical major lobe width, the dB attenuation is twice that of each of the two sets of sub-arrays taken separately, but this is achieved at the cost of a loss of 6 dB in terms of signal-to-noise ratio.

The AND logic operation brings neither any gain in resolution nor any loss in signal-to-noise ratio.

Since the two signals delivered by the two beam-shaping circuits have identical amplitudes, we have the optimal conditions of a multiplication operation.

The convolution operation, which is more efficient but whose implementation is more complicated than the product operation, enables the even greater attenuation of the jammer signals picked up during a reduced beam-shaping operation and not in the other one, owing to the absence of correlation with the signal sent out by the radar, or between then.

The array antenna may be a thinned or sparse antenna instead of being a filled one. In this case, its radiating elements and their individual phase-shifting modules are positioned, as shown in FIG. 6, in a loose grid of filled rows 21 and columns 20, organized, at reception, in two imbricated sets of filled linear sub-arrays:

- a first non-filled set of x linear sub-arrays 20, that are filled, vertical, juxtaposed, each constituted by m radiating elements, and
- a second non-filled set of y sub-arrays 21 that are linear, filled, horizontal, superimposed, each constituted by n radiating elements.

Advantageously, the spacing between the linear sub-arrays of each set increases, in geometrical progression, from one edge to the other of the antenna but other values of spacing without harmonic periodicity are possible.

The radiating elements located at the points of intersection of the vertical and horizontal linear sub-arrays take part in both sets and are fitted out with dual-output individual phase-shifter modules delivering signals that are identical in amplitude and in phase. The other radiating elements have individual phase-shifter modules with single outputs. Whether they come from single output or dual output modules, the signals have the same amplitude and have relative phases which are those of the antenna-aiming relationship.

The outputs of the vertical linear sub-arrays 20 of the first set are connected to the inputs of a first beam-shaping circuit 22 in the elevation plane while the outputs of the horizontal linear sub-arrays 21 of the second set are connected to the inputs of a second beam-shaping circuit 23 in the bearing plane.

Although this is not shown purely with a view to simplifying the figure, the two outputs of the two beam-shaping circuits 22, 23 are, as shown in FIG. 5, connected by means of two threshold circuits to the two inputs of a non-linear combination circuit obtaining a product or carrying out a convolution to generate the antenna output signal.

The antenna is aimed electronically by the individual phase-shifter modules, at reception and also at transmission in the case of a radar.

At reception, the first reduced beam-shaping circuit 22 delivers a signal corresponding to that of an antenna having a radiation pattern with, in the elevation plane, small minor lobes defined by the weighting relationship applied in an analog form to each filled vertical linear sub-array 20 and in the bearing plane, array lobes or scattered lobes depending on whether the sparseness of the set of filled vertical linear sub-arrays 20 is distributed periodically or randomly. FIG. 7*a* gives an example of such a pattern with scattered lobes.

At reception, the second reduced beam-shaping circuit 23 delivers a signal corresponding to that of an antenna having a radiation pattern with, in the relative bearing plane, small minor lobes defined by the weighting relationship applied in an analog form to each filled horizontal linear sub-array 21 and in the elevation plane, array lobes or scattered lobes depending on whether the sparseness of the set of filled horizontal linear sub-arrays 21 is distributed periodically or randomly. FIG. 7*b* gives an example of such a pattern with scattered lobes.

In their respective elevation and bearing planes, the two reduced beam-shaping formations obtained may be fixed or adaptive ones and, in the latter case, they enable the positioning of zeros separately in elevation and in bearing as shown previously in FIGS. 4*a* and 4*b*.

The setting of the thresholds of the two signals resulting from the two reduced beam-shaping operations separated in the elevation and bearing planes and their non-linear combination by multiplication or convolution makes it possible to obtain a reception signal having properties similar to that of a total beam-shaping antenna with only two reduced orthogonal beam-shaping operations of cumulated moments n+m. The number of degrees of freedom, in other words the number of adaptive zeros that can be achieved, is naturally only (m−1)+(n−1) but the array or scattered lobes have been eliminated by the operation of the product or of convolution provided only that the secondary lobes orthogonal to these array lobes or scattered lobes have themselves keen eliminated by the threshold-setting operation on the two channels whence the value of adaptive threshold taking account of the level of the disturbing signals, which are residues of clutter for example. The jamming type disturbing signals will be processed initially by the aiming of zeros in the two reduced adaptive beam-shaping operations, but residues if any will receive complementary processing through the combination of the threshold-setting operations and the product or convolution operations.

The proposed array antenna architecture avoids the limitations of the prior art by an organization of its radiating elements based on a parallel, side-by-side juxtaposition of m linear sub-arrays of n mutually contiguous elements, the phase centers of which are spaced out according to criteria for sampling the antenna surface that avoid the creation of high-level array lobes or scattered lobes. Being limited to this organization, the antenna could only be provided with an operation of beam-shaping in the plane perpendicular to the sub-arrays. To prevent this, the radiating elements of the antenna are used again to form a second parallel side-by-side juxtaposition of n sub-arrays of m elements orthogonal to the first sub-arrays and totally imbricated in these sub-arrays. Using these two sets of orthogonal sub-arrays, two beam-shaping operations are carried out at m and n moments in two orthogonal planes, the signals of which are combined non-linearly by product or convolution to obtain a reception signal similar to that of an array antenna with beam-shaping in two planes at n×m moments.

In the prior art, it was possible to obtain a similar reduction of the number of moments for a two-plane beam-shaping by the grouping of radiating elements of the array antenna into non-imbricated surface sub-arrays, but this was accepted by the existence of high-level array lobes or scattered lobes.

By carrying out a threshold-setting operation on the two signals resulting from the two single-plane reduced beam-shaping operations, before combining then to simulate a dual-plane beam-shaping operation, the signal-to-disturbance ratio is improved as the action of the thermal noise of each of the two signals in the product operation or convolution operation is practically eliminated, enabling the preparation of the reception signal.

The antenna architecture proposed has two reception channels coming from two reduced beam-shaping operations in which it may be advantageous, before the product or convolution operation, to carry out certain processing operations such as the Doppler filtering of fixed echoes in the case of a radar, these echoes then being duplicated. The cost of this duplication is nevertheless far smaller than that of a total beam-shaping operation in two planes, and is entirely warranted by the performance values obtained as compared with those of a two-plane reduced beam-shaping operation in the prior art.

In the prior art, the thinned or sparse array antennas are affected by powerful array or scattered lobes. The proposed antenna architecture avoids this major drawback. Furthermore, it must be noted that, while the properties of adaptivity are not required in reduced beam-shaping operations, these operations may be carried out in analog mode.

The limits of this architecture applied to a thinned or sparse array antenna lie in the fact that they can be used to obtain only one major lobe which, however, remains compatible with a monopulse angular divergence measurement, and in the fact that it requires two reception channels, the cost of which is far less than that of a filled antenna and is entirely warranted by the properties and performance characteristics obtained as compared with those of a prior art thinned or sparse antenna.

FIG. 8 exemplifies an embodiment of a non-periodic sparse array antenna with reduced beam-shaping operations, implementing the proposed architecture.

This antenna is formed by two imbricated sets of orthogonal linear sub-arrays of radiating elements:

- a first set of eleven horizontal linear sub-arrays 30 having ninety radiating elements each, and
- a second set of thirteen vertical linear sub-arrays 31 having seventy-six radiating elements each.

The radiating elements are fitted out with individual phase-shifter modules. To enable electronic scanning on ±45° without array lobes on the non-thinned axes of the two sets of radiating elements, the spacing from element to element in the two sub-arrays is 0.55 λ. To avoid having high-level array lobes on the thinned axes of the two sets of radiating elements, and to have preferably spread-out scattered lobes with lower peaks, the spacing between their sub-arrays is variable and rises from one edge of the antenna to the other, for example by geometrical progression. The antenna obtained is contained within a surface area of 49.5 λ by 41.8 λ, giving a directivity at 3 dB of about 1.45° by 1.7°. The equivalent filled antenna, in this respect, would have 6,840 radiating elements and individual phase-shifter modules while this one has only 1,835. The sparseness coefficient is therefore 3.73.

The output signals of the eleven horizontal linear sub-arrays 30 of the first set are digitized before being applied to a first circuit 32 for beam-shaping by computation. This circuit carries out a reduced adaptive beam-shaping operation in the vertical plane or elevation plane on thirteen points, enabling anti-jamming in ten different directions in elevation.

The output signals of the thirteen horizontal linear sub-arrays 31 of the second set are digitized before being applied to a second circuit 33 for beam-shaping by computation. This circuit carries out a reduced adaptive beam-shaping operation in the horizontal plane or relative bearing plane on eleven points, thus enabling anti-jamming in twelve different directions in relative bearing.

The two signals delivered by the two circuits 32, 33 for beam-shaping by computation, or rather their modules are applied to two threshold circuits 34, 35.

The signals delivered by the two threshold circuits 34 and 35 are then applied to the inputs of a logic circuit of the circuit 36 type taking their product and delivering the antenna reception signal.

It may be observed that the total number of movements of the reduced beam-shaping operations performed is 24. This gives the possibility of carrying out anti-jamming operations in twenty-two different directions. This characteristic is highly appreciable, especially if we take into account the fact that the jammers aligned on one and the same axis in elevation or in bearing are processed simultaneously by the creation of a single zero owing to its valley conformation. This is very promising in relation to the concept of scattered jamming by the illumination of a scattering surface.

What is claimed is:

1. a radiating element array antenna comprising:

radiating elements distributed in an array;

phase shifting module means connected to respective radiating elements for aiming the antenna by analogue beam shaping;

the radiating elements and respective phase shifting module means grouped together in two sets of linear sub-arrays when operating in a receive mode;

a first set having a plurality of linear sub-arrays parallel to a first direction;

a second set having a plurality of linear sub-arrays parallel to a second direction different from the first direction;

a preselected number of radiating elements being common to both the first and second sets;

the phase shifting module means associated with respective common radiating elements including two signal outputs;

first and second beam shaping circuits respectively connected to the first and second sets of linear sub-arrays for generating two beam shaping signals therefrom; and output circuit for non linearly combining the beam shaping signals to form a reception signal.

2. An antenna according to claim 1, wherein the directions of the two sets of linear sub-arrays are orthogonal to each other.

3. An antenna according to claim 2, wherein the direction of the linear sub-arrays of one of the sets is horizontal while the direction of the linear sub-arrays of the other set is vertical.

4. An antenna according to claim 1, wherein it is a thinned antenna, its array of radiating elements comprising voids of missing radiating elements, and the missing radiating elements being smaller in number than radiating elements that are present.

5. An antenna according to claim 1, wherein it is a sparse antenna, its array of radiating elements comprising voids of missing radiating elements, and the missing radiating elements being greater in number than radiating elements that are present.

6. An antenna according to claim 1 wherein, in each set of parallel, linear sub-arrays, the parallel linear sub-arrays are at a distance from each other by a spacing that varies from one edge of the antenna to the other.

7. An antenna according to claim 1, wherein said spacing varies from one edge of the antenna to the other according to a geometrical progression.

8. An antenna according to claim 1, furthermore comprising two threshold circuit means interposed between the two beam-shaping circuits and the output circuit for eliminating parasitic signals below a threshold value.

9. An antenna according to claim 1, wherein the output circuit is a convolution circuit.

10. An antenna according to claim 1, wherein the output circuit is a multiplier circuit.

11. An antenna according to claim 1 furthermore comprising, interposed between the two beam-shaping circuits and the output circuit, two threshold circuits converting the signals delivered by the two beam-shaping circuits into bivalent signals, and wherein the output circuit is an AND circuit.

12. An antenna according to claim 1, wherein the beam-shaping circuits are anti-jamming circuits.

* * * * *